US008560828B2

(12) United States Patent  
Signaoff et al.

(10) Patent No.: US 8,560,828 B2
(45) Date of Patent: Oct. 15, 2013

(54) SYSTEM AND METHOD FOR A COMMUNICATION SYSTEM

(75) Inventors: Christopher S. Signaoff, Hutto, TX (US); Tom W. Opsahl, Flower Mound, TX (US); Edward M. Riley, III, Flower Mound, TX (US); Justin S. Signaoff, Round Rock, TX (US)

(73) Assignee: DirectPacket Research, Inc., Irving, TX (US)

( * ) Notice: Subject to any disclaimer, the term of this patent is extended or adjusted under 35 U.S.C. 154(b) by 2486 days.

(21) Appl. No.: 11/403,548

(22) Filed: Apr. 13, 2006

(65) Prior Publication Data

US 2007/0245412 A1    Oct. 18, 2007

(51) Int. Cl.  
*H04L 29/06*    (2006.01)

(52) U.S. Cl.  
USPC .......................................................... 713/150

(58) Field of Classification Search  
None  
See application file for complete search history.

(56) References Cited

U.S. PATENT DOCUMENTS

| | | | |
|---|---|---|---|
| 5,838,683 A | 11/1998 | Corley et al. |
| 6,047,320 A | 4/2000 | Tezuka et al. |
| 6,266,809 B1 | 7/2001 | Craig et al. |
| 6,380,968 B1 | 4/2002 | Alexander et al. |
| 6,434,140 B1 | 8/2002 | Barany et al. |
| 6,611,503 B1 | 8/2003 | Fitzgerald et al. |
| 6,614,465 B2 | 9/2003 | Alexander et al. |
| 6,633,324 B2 | 10/2003 | Stephens, Jr. |
| 6,633,985 B2 | 10/2003 | Drell |
| 6,735,626 B1 | 5/2004 | Tezuka et al. |
| 6,795,444 B1 | 9/2004 | Vo et al. |
| 6,798,782 B1 | 9/2004 | Caronni et al. |
| 6,963,583 B1 | 11/2005 | Foti et al. |
| 7,016,935 B2 | 3/2006 | Lee et al. |
| 7,020,130 B2 | 3/2006 | Krause et al. |
| 7,023,465 B2 | 4/2006 | Stephens, Jr. |
| 7,031,341 B2 | 4/2006 | Yu |
| 7,039,701 B2 | 5/2006 | Wesley |
| 7,050,422 B2 | 5/2006 | Xu et al. |
| 7,159,036 B2 | 1/2007 | Hinchliffe et al. |
| 7,177,929 B2 | 2/2007 | Burbeck et al. |
| 7,181,530 B1 | 2/2007 | Halasz et al. |
| 7,194,526 B2 | 3/2007 | Kanemitsu |
| 7,206,808 B2 | 4/2007 | Babka et al. |
| 7,228,488 B1 | 6/2007 | Grass et al. |

(Continued)

OTHER PUBLICATIONS

International Search Report and Written Opinion issued for PCT/US2007/066451; Dated: Jul. 7, 2008; 11 Pages.

(Continued)

*Primary Examiner* — Jeffrey D Popham  
(74) *Attorney, Agent, or Firm* — Fulbright & Jaworski LLP

(57) ABSTRACT

A communication system is made up of several communication communities. Each community provides for communication between the endpoints connected into that community by connecting the endpoints and communication controllers located behind a firewall with an external communication controller outside of the firewall. In selected embodiments, such a community may be configured to connect an internal controller that is connected to a plurality of endpoints with another controller that is designed for connection to only one endpoint. When communication is desired outside of the individual communities, the external controller for that community establishes a connection with the external controller for the desired community. Once established, the communication data can be transmitted across community borders. In some embodiments, there may be a central external controller that is in communication with each of the external controllers for the other individual communities. In such embodiments, all inter-community communication will pass through that central controller.

23 Claims, 9 Drawing Sheets

(56) References Cited

U.S. PATENT DOCUMENTS

| | | | |
|---|---|---|---|
| 7,251,689 B2 | 7/2007 | Wesley | |
| 7,254,643 B1 | 8/2007 | Peters, Jr. et al. | |
| 7,293,169 B1 | 11/2007 | Righi et al. | |
| 7,328,406 B2 | 2/2008 | Kalinoski et al. | |
| 7,346,076 B1 | 3/2008 | Habiby et al. | |
| 7,346,912 B2 | 3/2008 | Seebaldt | |
| 7,353,380 B2 | 4/2008 | VanHeyningen | |
| 7,363,381 B2 | 4/2008 | Mussman et al. | |
| 7,370,097 B2 | 5/2008 | Hashimoto | |
| 7,372,957 B2 | 5/2008 | Strathmeyer et al. | |
| 7,385,622 B2 | 6/2008 | Babka et al. | |
| 7,436,428 B2 | 10/2008 | Schrader et al. | |
| 7,441,270 B1 | 10/2008 | Edwards et al. | |
| 7,649,898 B1 | 1/2010 | May, Jr. et al. | |
| 2001/0043571 A1 | 11/2001 | Jang et al. | |
| 2001/0046234 A1 | 11/2001 | Agrawal et al. | |
| 2003/0065737 A1* | 4/2003 | Aasman | 709/213 |
| 2003/0081783 A1 | 5/2003 | Adusumilli et al. | |
| 2003/0182451 A1 | 9/2003 | Grass et al. | |
| 2003/0227908 A1 | 12/2003 | Scoggins et al. | |
| 2003/0232648 A1 | 12/2003 | Prindle | |
| 2004/0037268 A1 | 2/2004 | Read | |
| 2004/0158606 A1 | 8/2004 | Tsai | |
| 2005/0021610 A1 | 1/2005 | Bozionek et al. | |
| 2005/0021772 A1 | 1/2005 | Shedrinsky | |
| 2005/0080919 A1* | 4/2005 | Li et al. | 709/236 |
| 2005/0122964 A1* | 6/2005 | Strathmeyer et al. | 370/352 |
| 2005/0125696 A1 | 6/2005 | Afshar et al. | |
| 2005/0141482 A1 | 6/2005 | Kleiner | |
| 2005/0243747 A1 | 11/2005 | Rudolph | |
| 2005/0259145 A1 | 11/2005 | Schrader et al. | |
| 2005/0271051 A1 | 12/2005 | Holloway et al. | |
| 2006/0098684 A1 | 5/2006 | Bozionek et al. | |
| 2006/0104288 A1 | 5/2006 | Yim et al. | |
| 2006/0109862 A1 | 5/2006 | Choi et al. | |
| 2006/0187903 A1 | 8/2006 | Kallio et al. | |
| 2006/0190719 A1 | 8/2006 | Rao et al. | |
| 2006/0224883 A1 | 10/2006 | Khosravi et al. | |
| 2007/0005804 A1 | 1/2007 | Rideout | |
| 2007/0022201 A1 | 1/2007 | Aaby et al. | |
| 2007/0036143 A1* | 2/2007 | Alt et al. | 370/352 |
| 2007/0239841 A1 | 10/2007 | Lehrman | |
| 2007/0242696 A1 | 10/2007 | Signaoff et al. | |
| 2008/0043091 A1 | 2/2008 | Lia et al. | |
| 2008/0134200 A1 | 6/2008 | Seebaldt | |
| 2008/0235362 A1 | 9/2008 | Kjesbu et al. | |
| 2009/0051752 A1 | 2/2009 | Lammers | |
| 2009/0112671 A1 | 4/2009 | Grodum | |

OTHER PUBLICATIONS

International Search Report and Written Opinion issued for PCT/US2007/066435; Dated: Apr. 2, 2008; 9 Pages.

International Search Report and Written Opinion issued for PCT/US07/66457 dated Jun. 17, 2008, 10 pgs.

International Search Report and Written Opinion issued for PCT/US2007/066460; Dated: Apr. 9, 2008; 10 Pages.

* cited by examiner

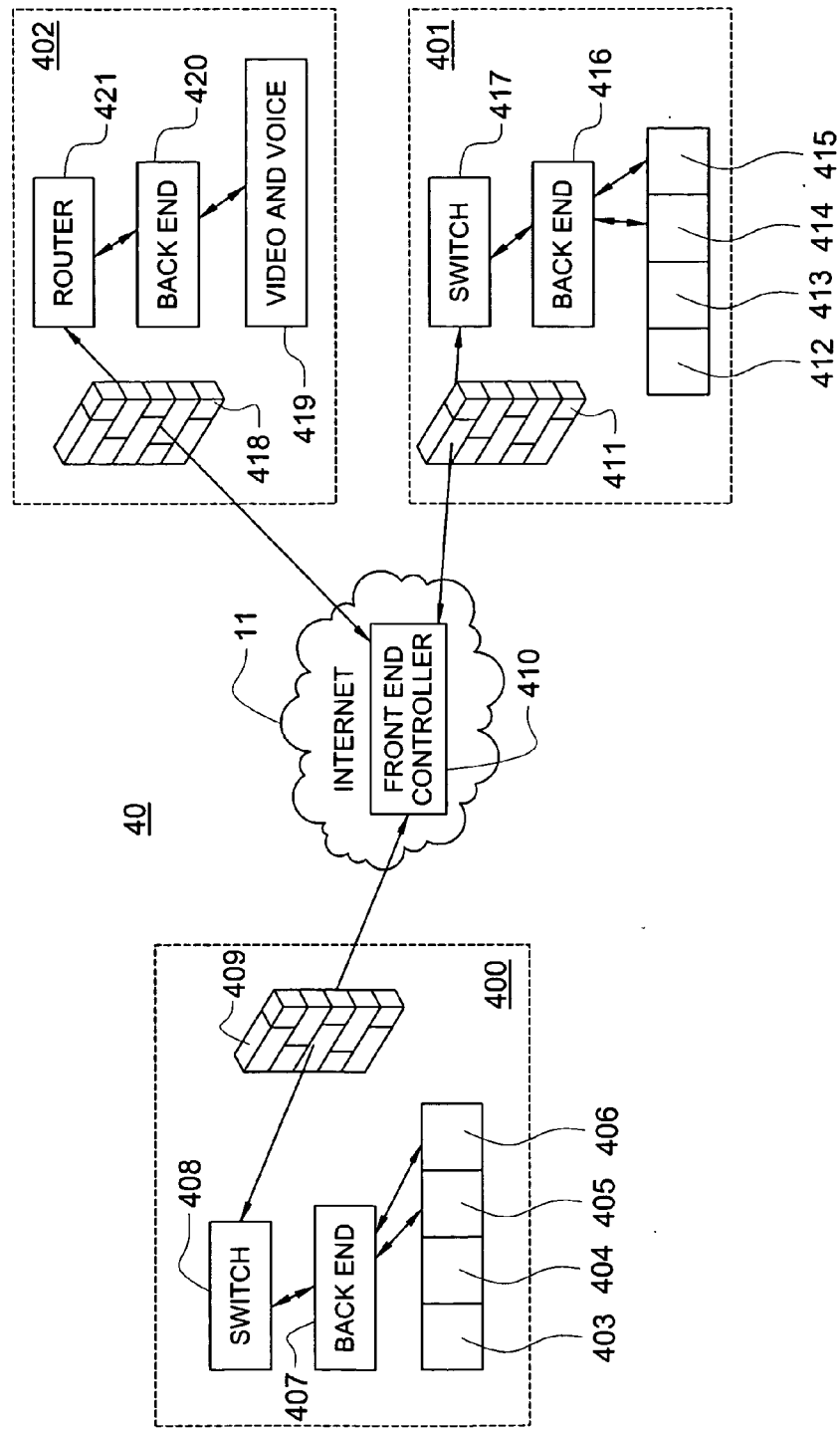

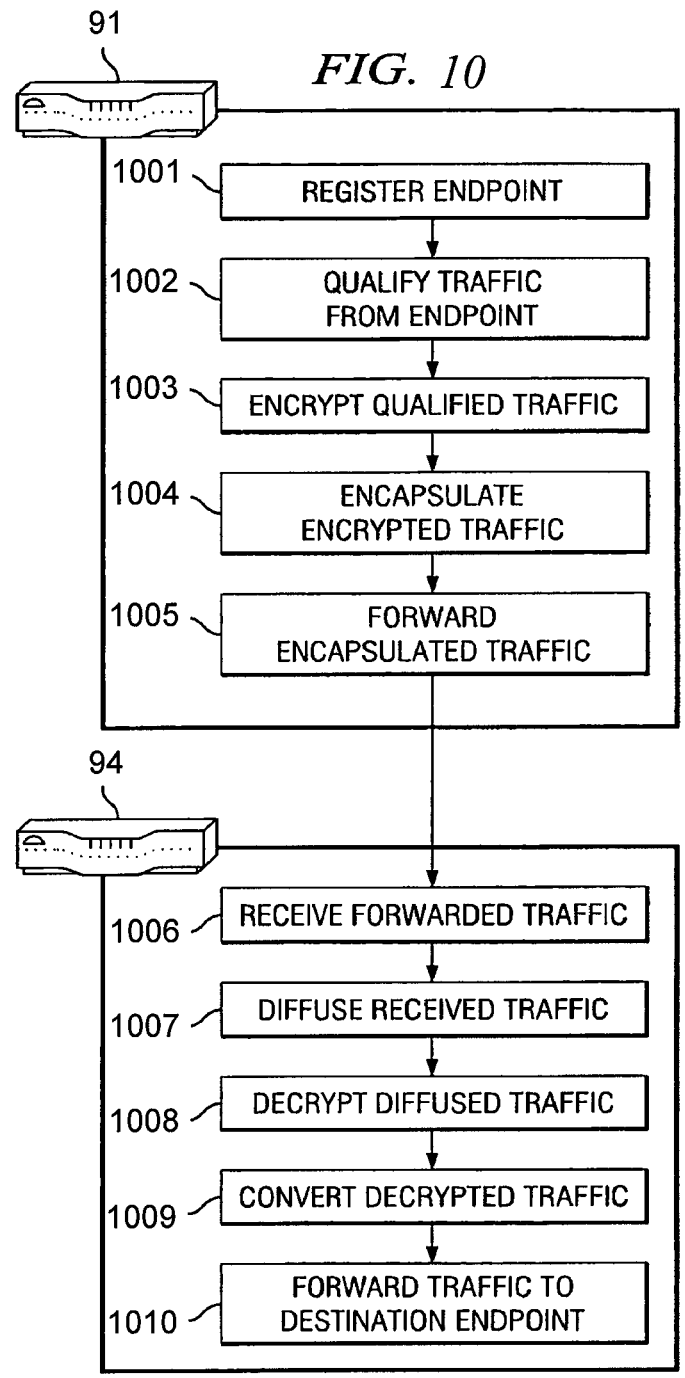

SYSTEM AND METHOD FOR A COMMUNICATION SYSTEM

CROSS-REFERENCE TO RELATED APPLICATIONS

The present application is related to concurrently filed, co-pending and commonly assigned U.S. patent application Ser. No. 11/403,549, entitled "SYSTEM AND METHOD FOR TRAVERSING A FIREWALL WITH MULTIMEDIA COMMUNICATION," the disclosure of which are hereby incorporated herein by reference.

TECHNICAL FIELD

The present invention relates, in general, to electronic communications, and, more specifically, to the architecture of a multimedia communication system.

BACKGROUND OF THE INVENTION

In today's connected electronic society, the technology and know-how to create a completely connected electronic global system has been available and in practice at various levels. However, the utopian ideas of complete and unfettered connectivity are seriously undermined by the electronic "outlaws." Computer viruses, industrial and national spying, information theft, and the like place real dollar risks to maintaining completely free connectivity. Because a genuine need exists for certain computer systems to be connected into the public domain, such as through the public or commodity internet, technology has been developed to provide various levels of protection from computer-based mischief.

One such technology used to minimize the risks for computer-based mischief is a firewall. Firewalls, which can be software, hardware, or a combination of both, are used in modern networks to screen out unwanted or malicious traffic. One of many techniques a firewall may use is packet filtering, wherein the firewall determines whether or not to allow individual packets by analyzing information in the packet header (such as the Internet Protocol (IP) address and port of the source and destination). Thus, various ports (defined below) or IP addresses may be blocked to minimize the risk of allowing malicious traffic into an important computer network or system. Another more advanced technique is called stateful inspection, wherein in addition to analyzing header information, a firewall keeps track of the status of any connection opened by network devices behind the firewall. Deciding whether or not a packet is dropped in a stateful inspection is based on the tracked status of the connection and information from within the packet header. In practice, firewalls (especially those used by large corporations) generally only allow traffic from the well-known ports, though such firewalls may be specially configured to allow traffic on any port. For multimedia communication systems that use multiple registered and dynamic ports, firewalls (unless specially configured) will generally block the data traffic on these ports between multimedia systems, thus, preventing communication.

In communications over the commodity internet, much of the communication occurs using Transmission Control Protocol/Internet Protocol (TCP/IP). TCP/IP is the transport protocol of the internet. One mechanism used to handle IP addresses is the TCP/IP port system. A port is a sixteen bit integer, the value of which falls into one of three ranges: the well-known ports, ranging from 0 through 1023; the registered ports, ranging from 1024 through 49151; and the dynamic and/or private ports, ranging from 49152 through 65535. The well-known ports are reserved for assignment by the Internet Corporation for Assigned Names and Numbers (ICANN) for use by applications that communicate using the Transmission Control Protocol (TCP) or User Datagram Protocol (UDP) and generally can only be used by a system/root process or by a program run by a privileged user. The registered ports may be registered for use by companies or other individuals for use by applications that communicate using TCP or UDP. The dynamic or private ports, by definition, cannot be officially registered nor are they assigned.

A TCP/IP port is typically assigned to user sessions and server applications in an IP network. Destination ports are generally used to route packets on a server to the appropriate network application. Thus, some ports are typically associated with particular internet applications. For example, port 80 is the standard port for Hypertext Transport Protocol (HTTP), while port 443 is the standard port for Secure HTTP (HTTPS). HTTP and HTTPS traffic may validly communicate over other ports; however ports 80 and 443 have been assigned as default ports for handling HTTP and HTTPS traffic, respectively. Routers and firewalls typically analyze the port numbers of the incoming data packets to determine how each packet should be handled. Routers review the port number to determine where to route the packet next. When using packet filtering methods, firewalls will review the port numbers to determine whether or not packets from that particular port represent traffic that is known to potentially contain a security threat. If a threat is indicated for that particular port, the packet will be dropped.

Many such firewalls use packet filtering to protect the underlying system. Thus, the ports that typical carry unpredictable packets are usually closed to traffic. In operation, a large number of ports are closed by default. These closed port ranges are usually associated with data traffic for applications that are unpredictable or known to carry undesirable traffic.

Another technique used by some firewalls and many other networking components to interface private or sub-networks with the commodity internet is Network Address Translation (NAT). NAT typically uses a single public IP address for the network interface, but then assigns individual clients on the private or sub-network a dynamic IP address that is selected from a group of private IP addresses for that particular private network or sub-network. NAT has extended the IP address technique beyond its finite number of addresses. However, the translation of addresses becomes a very complicated process when attempting to connect one endpoint to another behind a NAT system.

The use of firewalls and NAT to secure and administer networks has allowed an increase in overall connectivity, while improving the security of those networks. However, with this increased security, adapting to advances in communication technology is hampered. Voice over IP (VoIP) is becoming a popular alternative to the traditional Plain Old Telephone System (POTS) and the Publicly Switched Telephone Network (PSTN). In order to implement VoIP, though, new transmission protocols were developed to handle the specific needs of such system. Session Initiation Protocol (SIP) and H.323 are two examples of such protocols that have been defined for handling the administration of VoIP, and its natural extension to multimedia communication.

H.323 is a multimedia conferencing protocol, which includes voice, video, and data conferencing, for use over packet-switched networks. SIP is a signaling protocol for Internet conferencing, telephony, presence, events notification, and instant messaging. While these protocols allow for efficient management of IP-based communication, they run into serious problems when encountering firewalls and NAT systems.

Many communication protocols, including H.323 and SIP, use multiple different ports that can be selected dynamically as the session is initiated. The problem arises because the majority of these ports are closed in typical firewall installations. Therefore, in order to accommodate any type of IP-based communications, large numbers of ports would need to be opened in the firewall. If too many ports remain open, any given entity would risk exposure to potentially harmful unauthorized intrusion.

In NAT systems, each endpoint inside the system does not have a static IP address. Therefore, during setup of point-to-point communication, it is difficult to map out the connection because the target endpoint does not have a fixed, known IP address. The NAT server only provides an IP address when the internal endpoint needs one. Part of the header information in an H.323 or SIP data packet is the destination address. This information may be difficult to know when the NAT server has not assigned an IP address to a specific endpoint or considering that what IP address is assigned for a first call may not be the same IP addressed assigned for a subsequent call to the same endpoint.

To address this problem of firewall traversal and NAT, companies have designed various solutions from complex systems to simple workarounds. FIG. 1 is a block diagram illustrating a typical complex architecture of IP communication system 10. IP communication system 10 implements a multimedia communication system over the IP protocol. Communication in IP communication system 10 is limited by firewalls 100 and 101. Communication begins with the video and audio captured at endpoint 102. Using a multimedia transport protocol, such as H.323, SIP, or the like, multiple ports are selected by endpoint 102 to effect communication of the multimedia data. Endpoint 102 is connected to gatekeeper 103, which is still behind firewall 100.

Gatekeepers 103 and 107 are special gatekeepers that include proprietary code for establishing a connection over Internet 11 with base controller 106, which is located outside of firewalls 100 and 101. Base controller 106 also includes proprietary code that operates in connection with the code on gatekeepers 103 and 107. In operation, gatekeepers 103 and 107 are registered with base controller 106, such that a known communication setup routine has already been established between them. Firewalls 100 and 101 are modified to open a certain number of specific ports for all communications from gatekeeper 103. The firewall technicians maintaining firewalls 100 and 101 work with the provider of IP communication system 10 on installation to identify the specific ports that communication channels 105 will be transmitted over. Once those ports are opened, IP communication may occur over channels 105.

Gatekeepers 103 and 107 also provide for converting communication streams that may originate for different ports into channels 105. For example, monitor 102 communicates using H.323 which uses communication channels 104. Gatekeeper 103 shifts the data from communication channels 104 over to communication channels 105 in order to traverse firewall 100.

IP communication system 10 may also include special communication equipment, such as communication unit 109, which includes special proprietary code specifically developed for use in IP communication system 10. When using this special equipment, a user is able to connect to base controller 106 without first connecting to gatekeeper 103. Communication unit 109 is also registered with base controller 106 and packages all communication streams into channels 105 to traverse firewall 100 using the specified ports. Thus, a user at communication unit 109 may establish IP communication with a user at endpoint 108 without first connecting to gatekeeper 103. Examples of such systems configured similar to IP communication system 10 are provided by companies such as TANDBERG and the like. The limitation of such systems is that holes are still opened in the firewalls. There is nothing already in the security provisions of the firewalls that would prevent hostile traffic from entering through the ports that are opened to implement IP communication system 10.

FIG. 2 is a block diagram illustrating IP communication system 20. IP communication system 20 is configured to allow various levels of IP communication between individuals located at entity site 200, remote entity site 210, and home site 217. IP communication system 20 is implemented using a base server, communication server 203, in communication with individual client instances, clients 204, 209, and 212. At entity site 200, communication server 203 is placed in the middle-network zone, DMZ 218, which is the sub-network that sits between the trusted network of entity site 200 and Internet 11. Many network components or servers that have direct connectability to Internet 11 are situated within DMZ 218. For example, in addition to communication server 203, DMZ 218 also contains e-mail server 215, Web server 216, and the like. DMZ 218 is typically delimited by the private network firewall, such as private firewall 201, and an Internet firewall, such as Internet firewall 202. Internet firewall 202 maintains more open ports that are typically useful in receiving Internet-driven communication, such as email, Web-requests, and the like, while private firewall 201 is much more restrictive in the ports that it allows to have access into the private network of entity site 200.

When IP communication is desired, endpoints 205 and 206 each establish connections to client 204. Client 204 receives all of the communication streams directed to different ports, multi-port communications 207, and multiplexes those different communication streams into a single stream directed to a single port, single port data stream 208. In setting up IP communication system 20, the firewall administrators designate a single, specific port in both private firewall 201 and Internet firewall 202 for accepting data packets. Client 204 then transmits the multiplexed communication over single port data stream 208 to communication server 203 via private firewall 201. Communication server 203 will then transmit the multiplexed communication to the targeted endpoint at either one or both of remote entity site 210 and home site 217. Similarly, endpoints 213 and 214 communicate with client 212, which multiplexes the communications on multi-port communications 207 into a single port stream on single port data stream 208. Client 212 then transmits the multiplexed communication stream through remote firewall 211 and Internet firewall 202 to communication server 203. The communication stream from client 212 comes into Internet firewall 202 addressed to the specific port designated for the IP communication. Internet firewall 202, therefore, lets the data packets through to communication server 203. Communication server 203 is then able to transmit the communication stream to client 204 through private firewall 201.

FIG. 3 is a block diagram illustrating IP communication system 30. Instead of opening up new holes in firewalls 300 and 301, or using any existing open ports, IP communication system 30 simply goes around the company firewall, e.g., firewalls 300 and 301. IP communication system 30 connects to Internet 11 using a standard, non-secure Internet connection, connection 304. IP communication system 20 comprises endpoints 302 and 303 that include proprietary code enabling IP communication to be established over connection 304.

Because neither connection 304 nor the communication equipment (i.e., endpoints 302 and 303) are connected into the users systems, there is little danger that any faults or malevolent traffic will jeopardize the system. However, implementing a totally separate system does not take advantage of the benefits that can be attributed to using the entity's protected, backend system. An example of such a system that addresses the firewall and NAT problem by completely bypassing the company's protected, backend system are video conferencing systems from Polycom, Inc.

BRIEF SUMMARY OF THE INVENTION

The present invention is directed to a system and method for managing a communication system. The system is made up of several communication communities that provide communication between each of the various endpoints connected into the community and also allows for the individual communities to inter-communicate with the other communities in the communication network. In establishing the communication configuration in one of the communities/sub-communities, a communication request is received at an external controller from a first controller behind a firewall. The first controller connects to multiple endpoints provided for users. A communication channel is established between the first controller and the external controller after the external controller has authenticated or verified the identification of the first controller. A second communication channel is opened between the external controller and at least one other controller behind another firewall, where the other controller is connected to a single communication endpoint. In the configuration of the community/sub-community in selected embodiments of the present invention, then, there is at least one controller that services multiple endpoints and at least one other controller that is dedicated for a single endpoint. Multimedia communication data is transmitted between the first controller and the other controller where the multimedia data passes through the external controller. This multimedia communication data is distributed to the communication endpoints, including the single communication endpoint, that are connected to or participating in the particular communication session.

The various additional representative embodiments of the present invention also include inter-communication between the communities/sub-communities described above. Communication in the first community is established as described above: the endpoint requests communication from the internal controller, which makes that request outside of the firewall to the external controller. Communication in any other communication community is also established similarly. Another endpoint requests communication to the internal controller that it is connected to, which then makes that request outside of its firewall to the other external controller. Once everything is verified, a communication channel is open between the other endpoint and the other external controller. When either of the communication requests request communication between endpoints located in the separate communities, another communication connection is established between the two external communication controllers of the different communities. The communication data would then be transmitted between the two controllers through that connection.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 is a block diagram illustrating a communication community configured according to one embodiment of the present invention;

FIG. 10 is a flowchart showing for an embodiment of the invention, example steps that may be employed to traverse a firewall.

DETAILED DESCRIPTION OF THE INVENTION

Figure 1:
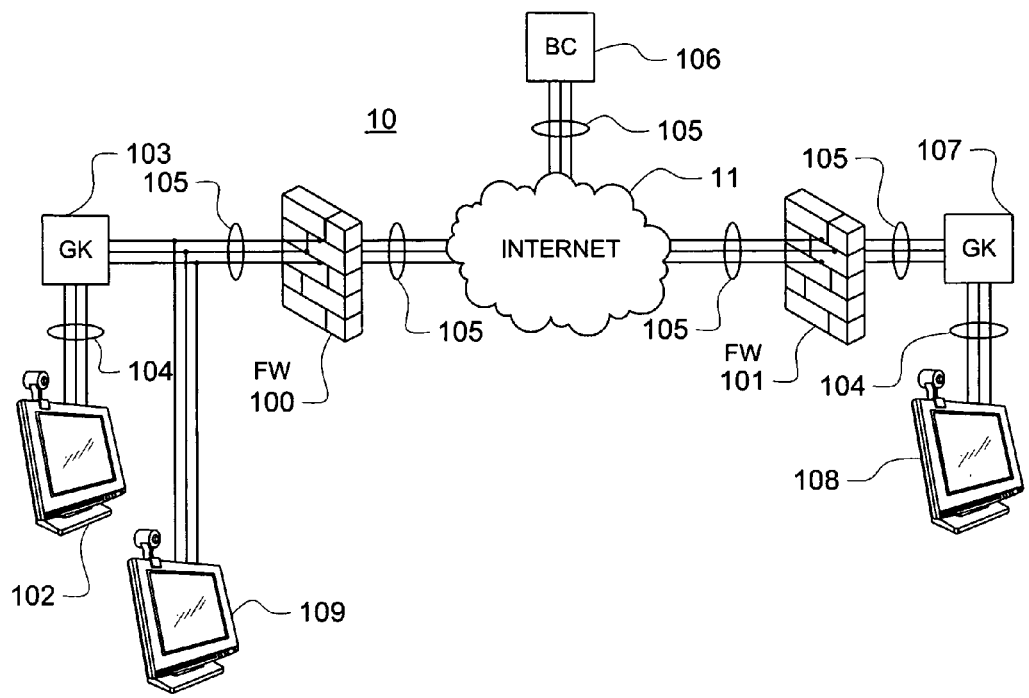
FIG. 1 is a block diagram illustrating a typical complex architecture of an IP communication system.
Figure 3:
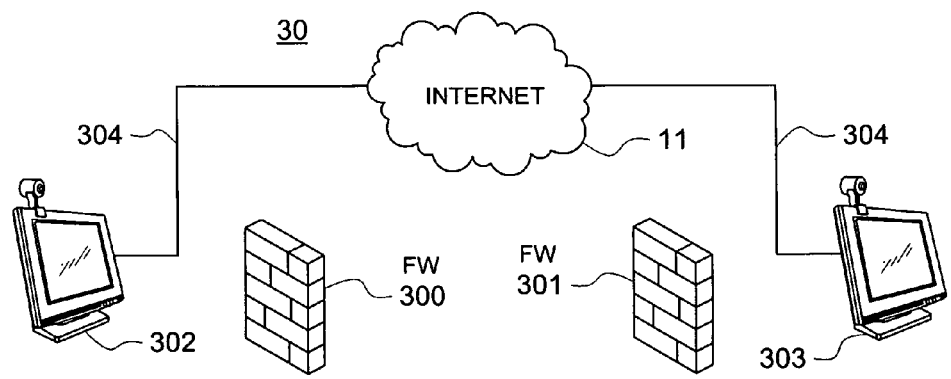
FIG. 3 is a block diagram illustrating another IP communication system.
Figure 2:
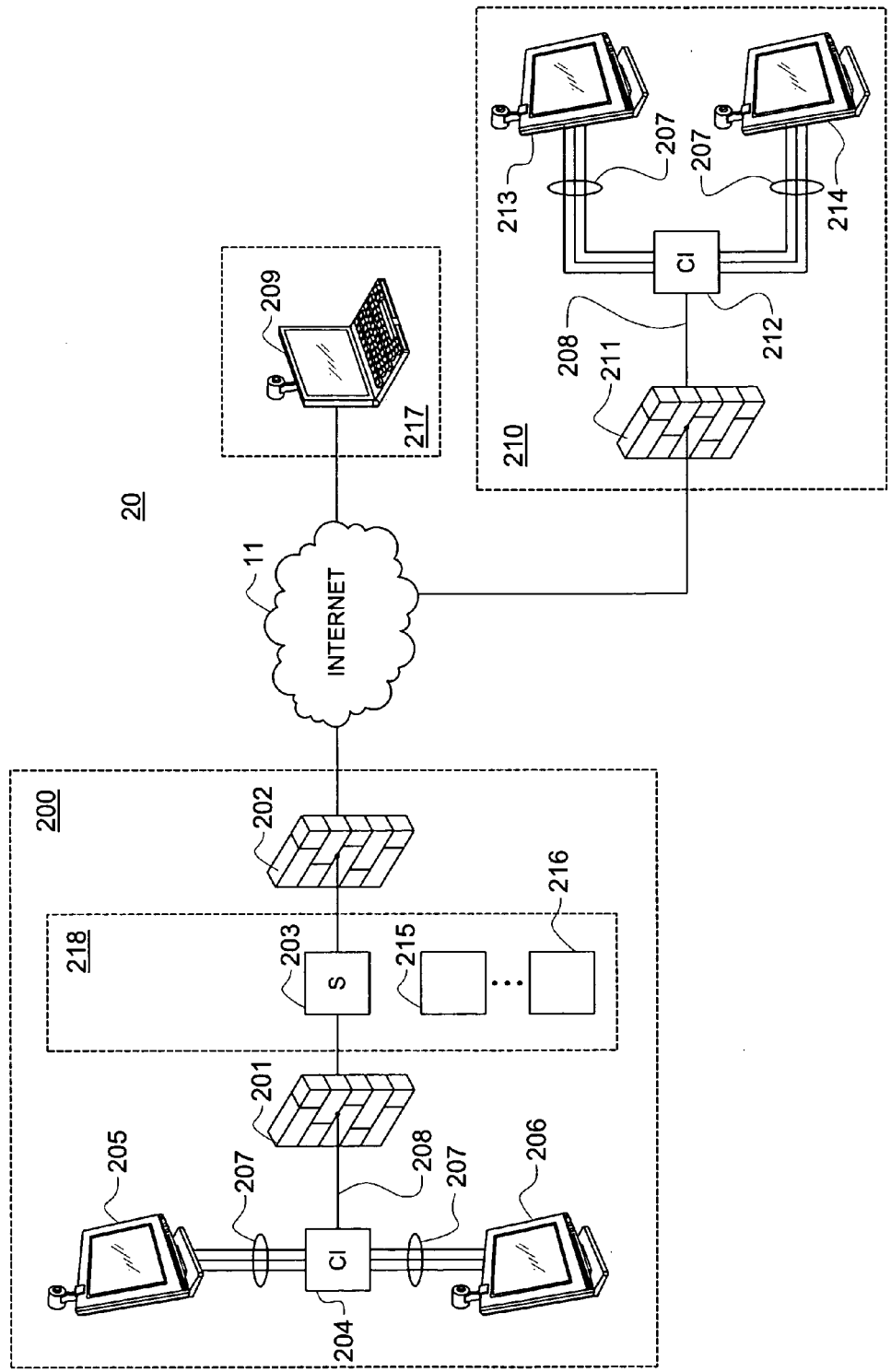
FIG. 2 is a block diagram illustrating another IP communication system.

FIG. 4 is a block diagram illustrating communication community 40 configured according to one embodiment of the present invention. Communication community 40 establishes a reliable multimedia communication system between multiple locations and multiple users at those different locations. For purposes of this example, principal office 400 is the principal business location for a company. Satellite office 401 is a branch office located in a suburb of the city where principal office 400 is located. Travel office 402 is a hotel room across the country where the company's CEO is attending a company meeting. Communication community 40 allows the company CEO to establish connection into the community from where ever he is located and has access to Internet 11.

The features of communication community 40 are implemented by the system architecture operating at each location.

Principal office 400 includes multiple endpoints, 403-406, such as telephones, computer terminals, and the like, that are configured for multimedia communication. Each of multiple endpoints 403-406 is connected to backend controller 407. Backend controller 407 manages the communication interactions with endpoints 403-406 and allows the communication to be transmitted to switch 408 and firewall 409 and eventually out to Internet 11 and front end controller 410.

In setting up the components of communication community 40, each of the components is registered with the other. For example, each of backend controllers 407 and 416 registers with front end controller 410. This process may be performed during initial system setup by Information Technology (IT) professionals. Backend 420 is also registered with front end controller 410. However, because backend 420 is a portable unit, once registered, various individuals may use backend 420 to establish verified connections into communication community 40 from remote, temporary locations. Again, the registration procedure for backend 420 may also be performed by IT professionals. Each endpoint, endpoints 403-406, 412-415, and 419 may also register with their associated backend controller. By registering each component to communication community 40, communication may be more-reliably established because each component is aware of the detailed identification information of the other components in the system.

It should be noted that back end controller 407 may be configured according to various multimedia communication protocols and systems. One example of such a system is described in technology covered by co-pending, commonly owned, U.S. patent application Ser. No. 11/403,549, entitled, "SYSTEM AND METHOD FOR TRAVERSING A FIREWALL WITH MULTIMEDIA COMMUNICATION." Such technology converts multiport transport protocols, such as H.323, SIP, and the like, into a single port transport protocol that can easily traverse firewalls with valid, standard single-port traffic.

A variety of protocols require the use of multiport traffic. Whether the traffic is data between applications, voice communications, or video conferencing, whenever multiport traffic is used there is a possibility of some or all of the traffic being blocked by a firewall between two devices that are attempting to communicate. As an example, video conferencing systems, whether they are based on H.323, SIP, or other similar multimedia communication protocols, use multiple ports and multiple protocols in order to enable two-way audio and video communication. The communication protocols specify different types of traffic that may be sent between endpoints which include media traffic (voice, video, and the like) along with the control traffic (camera, connection control, and the like). The media traffic is comprised of data for the images and sound being transmitted between endpoints with the control traffic comprising data used to control the connection between endpoints and the features of the endpoint (e.g., camera direction, zoom, and the like). Due to its higher throughput rate, UDP may typically be utilized for the real-time communication traffic between endpoints. TCP may be utilized for traffic requiring data integrity (e.g., control traffic). As such, video conferencing systems typically make use of both TCP and UDP to transport the multimedia data to enable communication. The ports that are typically used to enable the two-way communication include various ports across the well-known ports, the registered ports, and the dynamic ports. Firewalls are usually set up to block unrequested traffic and/or traffic coming in on dynamic ports. Furthermore, UDP does not provide a mechanism for identifying received traffic as requested traffic. Thus, programs and endpoints that send traffic conforming to UDP are at risk of having that traffic blocked by the remote endpoint's firewall for both being unrequested and being sent on a blocked port.

Figure 9:
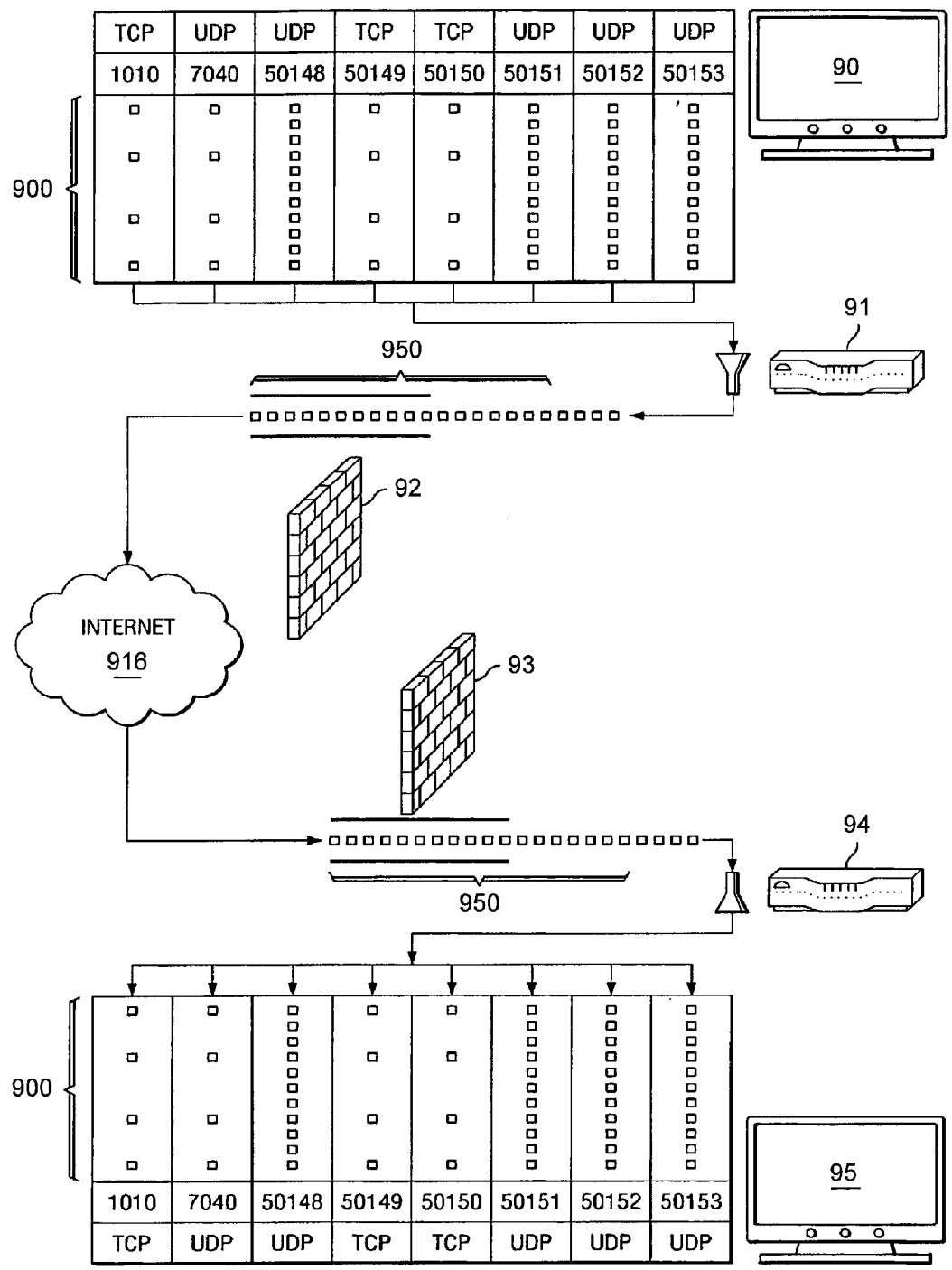
FIG. 9 is a diagram illustrating an IP communication system configured according to one embodiment of the present invention.

Referring to FIG. 9, video conference endpoint 90 attempts to send multimedia data (packets 900) to video conference endpoint 95, with network devices (e.g., backend controllers) 91 and 94 in the system. In this embodiment, endpoint 90 is a video conference endpoint that uses a multiple port communication protocol in order to establish communication with endpoint 95. For the purposes of this example, endpoint 90 uses ports 1010, 7030, 50148-50153. The data transmitted using ports 1010 and 50149-50150 utilize TCP as the transport protocol while the data transmitted using ports 7030, 50148, and 50151-50153 utilize UDP as the transport protocol. Packets from each of these ports conforming to these various protocols and sub-protocols are received by network device 91. It should be noted that additional or alternative examples of endpoints may use more or fewer ports of different numbers based in part on the applications or protocols used to facilitate multimedia communication.

The received packets are encapsulated to conform to a protocol used by devices 91 and 94 for transmitting data, which may include, but is not limited to: TCP, UDP, Stream Control Transmission Protocol (SCTP), Datagram Congestion Control Protocol (DCCP), Real-time Transport Protocol (RTP), and the like. Device 91 receives packets 900 from endpoint 90 that conform to both TCP and UDP, encapsulates each of multiport packets 900 into single-port packets 950 that conform to a single-port communication protocol used by devices 91 and 94, and sends packets 950 to device 94. The method of encapsulation may comprise using some or all of the information (header and data) within each of packets 900 as the data section for encapsulated packets 950.

The encapsulated packets are sent to device 94 using any of the well-known or registered ports, which are the ports that are typically open in standard firewalls. One such well-known port that could be chosen is port 443, which is commonly reserved for HTTPS traffic by ICANN and is commonly open by default on most firewalls. While the packets may be sent along any of the well-known, registered, or dynamic ports, the preferable port used may be a port that is commonly open on most firewalls in their standard configurations (e.g., the well-known ports, certain registered ports, and the like).

Firewall 92 inspects the traffic from device 91 before sending it out through Internet 916 to device 94. When the traffic arrives at firewall 93, it inspects the traffic, determines that it is valid traffic on a well-known port, and passes it along to device 94.

Device 94 receives encapsulated single-port packets 950 sent from device 91. Device 94 then reconstructs multiport packets 900 using packets 950. Reconstruction may be performed by any suitable method including hash-like functions or tables. As an example, header information within one of packets 950 may be an input to a hash-like function that returns the destination IP address and port numbers for a given packet. In the case of a hash-like table, device 91 may use a portion of the header or data in each of packets 900 as the index of a hash-like table and then convert packets 900 to packets 950. Device 94 upon receiving packets 950, may use a portion of the header or data in each of packets 950 as the index of a hash-like table and then reconvert packets 950 back to packets 900, recovering the original IP addresses and ports based on information stored in the hash-like table.

From the original headers, device 94 determines for each packet that it is for delivery to endpoint 95. Device 94 then sends the packets to endpoint 95 using each packet's destination port. Thus, if a port and protocol are advantageously chosen (such as port 443 and Secure Sockets Layer (SSL)), communications traffic from endpoint 90 may be sent to endpoint 95 with no modification or user intervention to traverse firewalls 92 and 93. While one-way communication is described (from endpoint 90 to endpoint 95) it is noted that each of devices 91 and 94 may perform the steps of receiving multiple packets, encapsulation, port translation, decapsulation, and resending multiple packets in order to enable two-way communication between endpoints 90 and 95. Additional or alternative embodiments may use any of the well-known or registered ports that are typically or commonly open in standard firewalls to send packets between devices 91 and 94. While any of the well-known, registered, or dynamic ports may be used, it is preferable to select a port that is commonly open in firewalls.

It should be noted that in additional or alternative embodiments of the present invention, network or other errors may occasionally lead to lost or corrupted packets and some protocols (such as TCP) specify that in such cases these lost or corrupted packets be resent, which is at odds with maintaining real-time communication. With real-time communication, current data takes precedence over lost previous data since resent packets of previously lost or corrupt data may arrive too late to be useful. As such, when receiving a request to resend a packet containing real-time data (e.g. data corresponding to the audio or video of the communication) devices 91 and 94 may simply ignore the resend request or, alternatively, send a current data packet masquerading as the previously sent and subsequently lost packet, as alternate data.

FIG. 10 is a flowchart that shows for an embodiment of the invention, example steps that may be employed by devices 91 and 94 to traverse a firewall. An endpoint, when connected to a network, first registers with device 91 by the endpoint identifying itself as a compliant endpoint (e.g., it is an endpoint that conforms to H.323, SIP, VoIP, or the like), as shown by step 1001.

On a given network, multiple devices may be connected, as such, device 91 may receive traffic from many devices within that network. Thus, device 91 qualifies the traffic it receives to ensure that the traffic sent to device 94 is appropriate traffic. This is shown in step 1002 and may be accomplished by comparing a given packet's source IP and port addresses to those of endpoints that have registered with device 91. In step 1003, device 91 encrypts the previously qualified traffic securing the communication between two endpoints using any suitable encryption method including, but limited to: AES 128-bit, TDES, Skipjack, or the like. In step 1004, the encrypted traffic is then encapsulated to conform to a single port protocol, such as SSL, by placing the previously encrypted packet into a new packet conforming to SSL protocol. As shown by step 1005, the encapsulated traffic is then forwarded to device 94.

In step 1006, device 94 receives the single port traffic from device 91 and is diffused by step 1007 by restoring the original IP addresses and port numbers to the individual packets. In step 1008, this diffused traffic is then decrypted, thus, recovering the original multimedia and control communication information within the packets. In step 1009, the packets are then restored to their original transport protocol, such as TCP, UDP, or the like. With the packets being fully restored, they are then forwarded to the destination endpoint by device 94, as shown by step 1010.

It is noted that while the disclosure has used the communication between two video conference endpoints as an example, it is understood that the systems and methods described may be used by other programs, applications, communications systems, and the like, that use multiport protocols for communication. As such, embodiments of the invention may be used for audio systems VoIP systems, or any other system that uses a multiport protocol to transfer data between devices. Referring back to FIG. 9 as an example, endpoints 90 and 95 may be VoIP endpoints engaging in voice communication. In this embodiment the multiport VoIP protocol traffic from endpoint 90 may be received by device 91, converted to a single port protocol by device 91, encapsulated by device 91, transmitted to device 94, decapsulated by device 94, converted back to the original multiport protocol by device 94, transmitted to endpoint 95, and received by endpoint 95, as described in further detail above. The same holds true for other types of programs, equipment, or applications using a multiport protocol to transfer data across a network.

Front end controller 410 is located outside of firewall 409. It has an address, which can be an IP address, a Uniform Resource Locator (URL), or the like, that is known specifically by back end 407. Moreover, front end controller 410 maintains a security table that allows it to selectively connect with only those backend controllers that have a valid security key. For example, endpoint 406 desires to make a video call to another party within communication community 40. Backend controller 407 knows the address for front end controller 410. In order to initiate the communication, backend controller 407 transmits a request through switch 408 and firewall 409 to the specific address of front end controller 410 for such communication. Along with the request, backend controller 407 also sends a security key. When front end controller 410 receives the request and the key, it first verifies and authenticates the key to make sure that the component requesting access is a valid and authorized component. Once it is authenticated as a valid backend, the request for communication is opened and the multimedia communication stream will be managed by front end controller 410 between endpoint 406 and it's destination address.

Each of the other locations in communication community 40 has similar configurations as principal location 400. Satellite location 401 includes endpoints 412-415, backend controller 416, switch 417, and firewall 411. Travel office 402 includes a single endpoint, endpoint 419, backend controller 420, and router 421, which may be the high speed modem found in the CEO's hotel room. The hotel Internet system also provides firewall 418. The configuration of communication community 40 that joins each of principal office 400, satellite office 401, and travel office 402 provides a unique communication system architecture. The key components of this system of communication community 40 include the backends located behind each firewall, backend controllers 407, 416, and 420, where backend 420 provides only for a single endpoint connection; front end controller 410, which facilitates the communication by providing a known component outside of the firewalls that has a known connection pipe to each of backend controllers 407, 416, and 420; and endpoints 403-406, 412-415, and 419, which provide the multimedia communication devices for the communication. By providing these components both in front of and behind the various firewalls, communication community 40 provides a robust, secure, and highly scalable communication system.

It should be noted that in various additional or alternative embodiments of the present invention, each location other than travel office 402 could have different numbers of endpoints connected thereto depending on the capacity of the associated backend controller. Moreover, each location may be separated by any distance, as long as the endpoints or backends can access Internet 11. Such access may be accommodated through wired connections or wireless connections to any of the points within the system.

Figure 5:
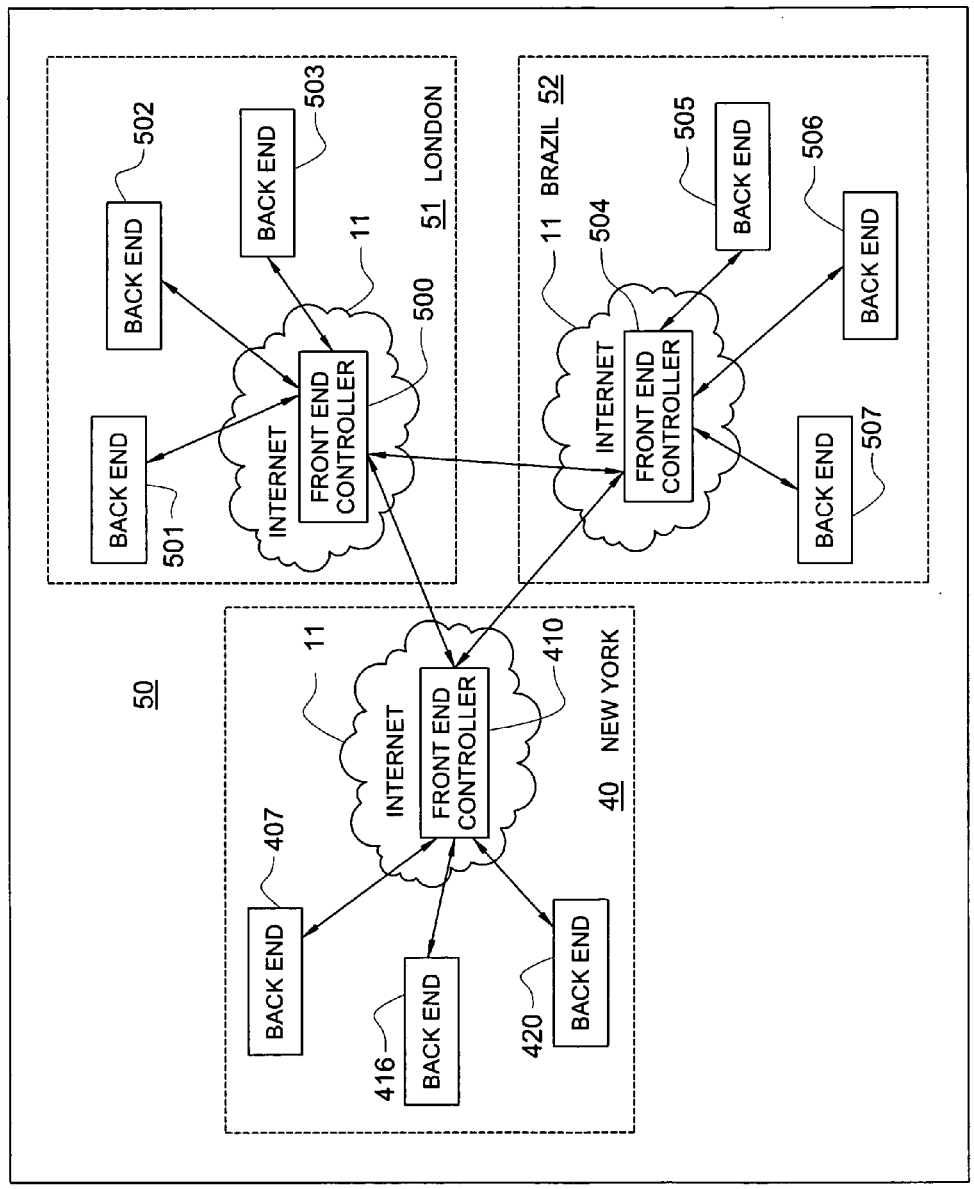
FIG. 5 is a block diagram illustrating an extended communication community configured according to one embodiment of the present invention.

FIG. 5 is a block diagram illustrating expanded communication community (ECC) 50 configured according to one embodiment of the present invention. ECC 50 creates a scaled communication network by combining or joining the communication capabilities of several communication sub-systems into a single expanded community. For example, communication community 40, as described in FIG. 4, is noted in ECC 50 as being located in New York. It is joined with communication community 51 and 52 located in London and Brazil, respectively. Each member state (i.e., communication communities 40, 51, and 52) of ECC 50 is at once an autonomous communication system and a shared communication system facilitating multimedia communication between endpoints in Brazil, London, and New York. The association of backend controllers 407, 416, and 420 with front end controller 410 facilitates communication in New York, while the association of backend controllers 501-503 with front end controller 500 facilitates communication in London, and the association of backend controllers 505-507 with front end controller 504 facilitates communication in Brazil.

When a user with an endpoint connected to backend controller 416 desires to participate in multimedia communication, such as a video conference, with a user with an endpoint connected to backend controller 503 in London, backend controller 416 requests to initiate communication with front end controller 410 with the identification information from the New York user's endpoint. After verifying and authenticating the security key transmitted over Internet 11 by backend controller 416, front end controller 410 opens a communication channel between itself and backend controller 416. The communication request information from the New York endpoint transmitted by backend controller 416 to front end 410 includes the destination address of the London endpoint. Front end 410 recognizes that the destination endpoint does not reside within its communication community 40. Using a communication table stored with front end controller 410, front end controller 410 looks up the address to initiate communications with the London endpoint. Front end controller transmits a communication request to front end 500 within communication community 51 that includes a security key and other identification information.

Upon receipt of the communication request from front end controller 410, front end controller 500 verifies and authenticates the security key just as it would when receiving a communication request from any of backend controllers 501-503. In fact, when any of front end controllers 410, 500, and 504 receive communication requests from any other front end controller, it views that request as being from any other backend controller. The front end controllers make no distinction between communication from front end controllers or backend controllers.

When front end controller 500 authenticates and verifies the communication request from front end controller 410, a communication path is opened between the two. Front end controller 500 also will use the address of the London endpoint to establish communication with backend controller 503 and then, subsequently, with the destination endpoint. Once the communication lines have been established between the New York and London endpoints, the New York and London users may communicate using multimedia data, such as with video, audio, and data.

Figure 6:
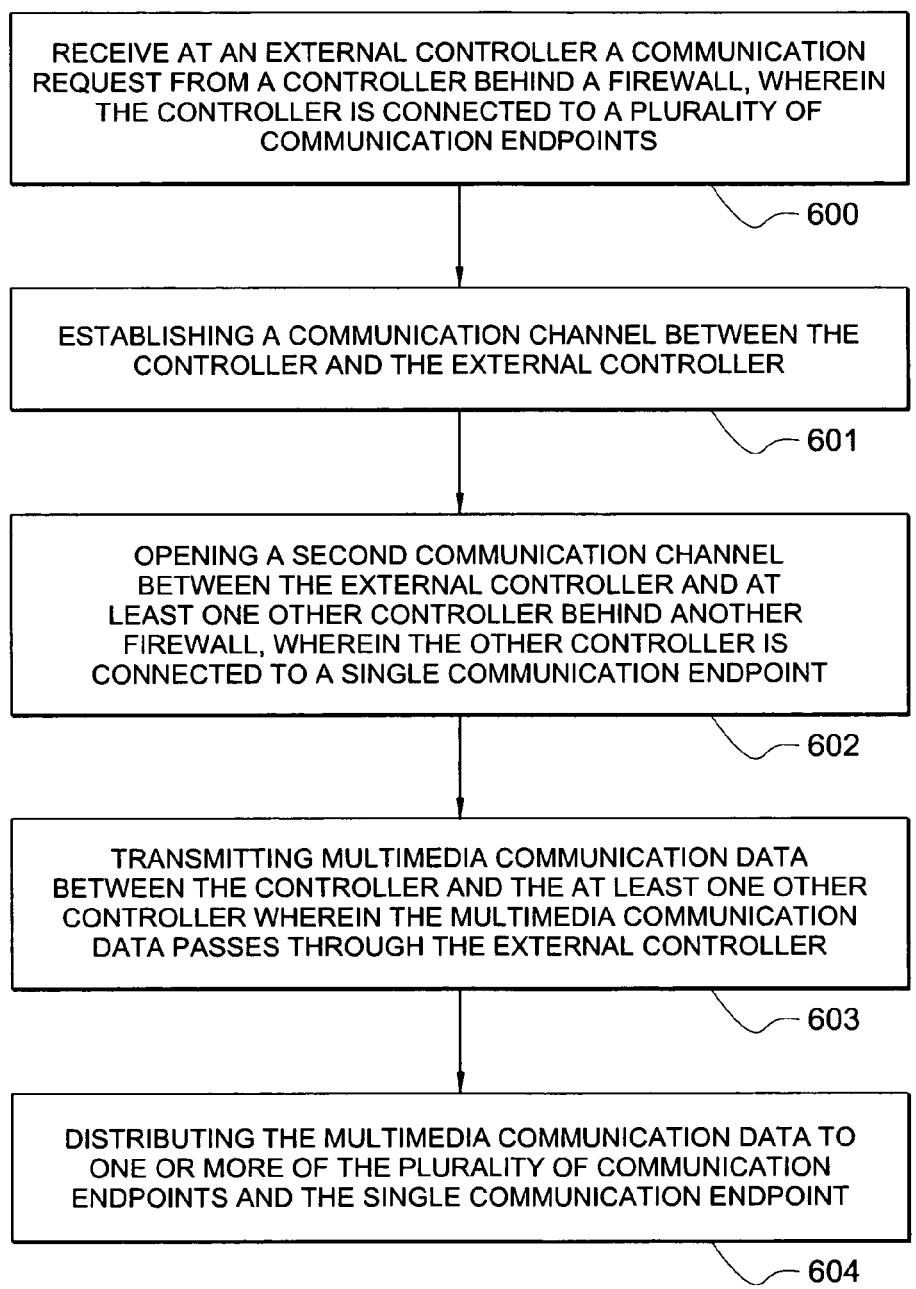
FIG. 6 is a flowchart illustrating example steps executed in implementing one embodiment of the present invention.

FIG. 6 is a flowchart illustrating example steps executed to implement one embodiment of the present invention. In step 600, a communication request is received at an external controller from a first controller behind a firewall, where the controller is connected to a plurality of communication endpoints. A communication channel is established, in step 601, between the controller and the external controller. A second communication channel is opened, in step 602, between the external controller and at least one other controller behind another firewall, where the other controller is connected to a single communication endpoint. In step 603, multimedia communication data is transmitted between the first controller and the other controller where the multimedia data passes through the external controller. The multimedia communication data is distributed, in step 604, to the selected communication endpoints including the single communication endpoint.

Figure 7:
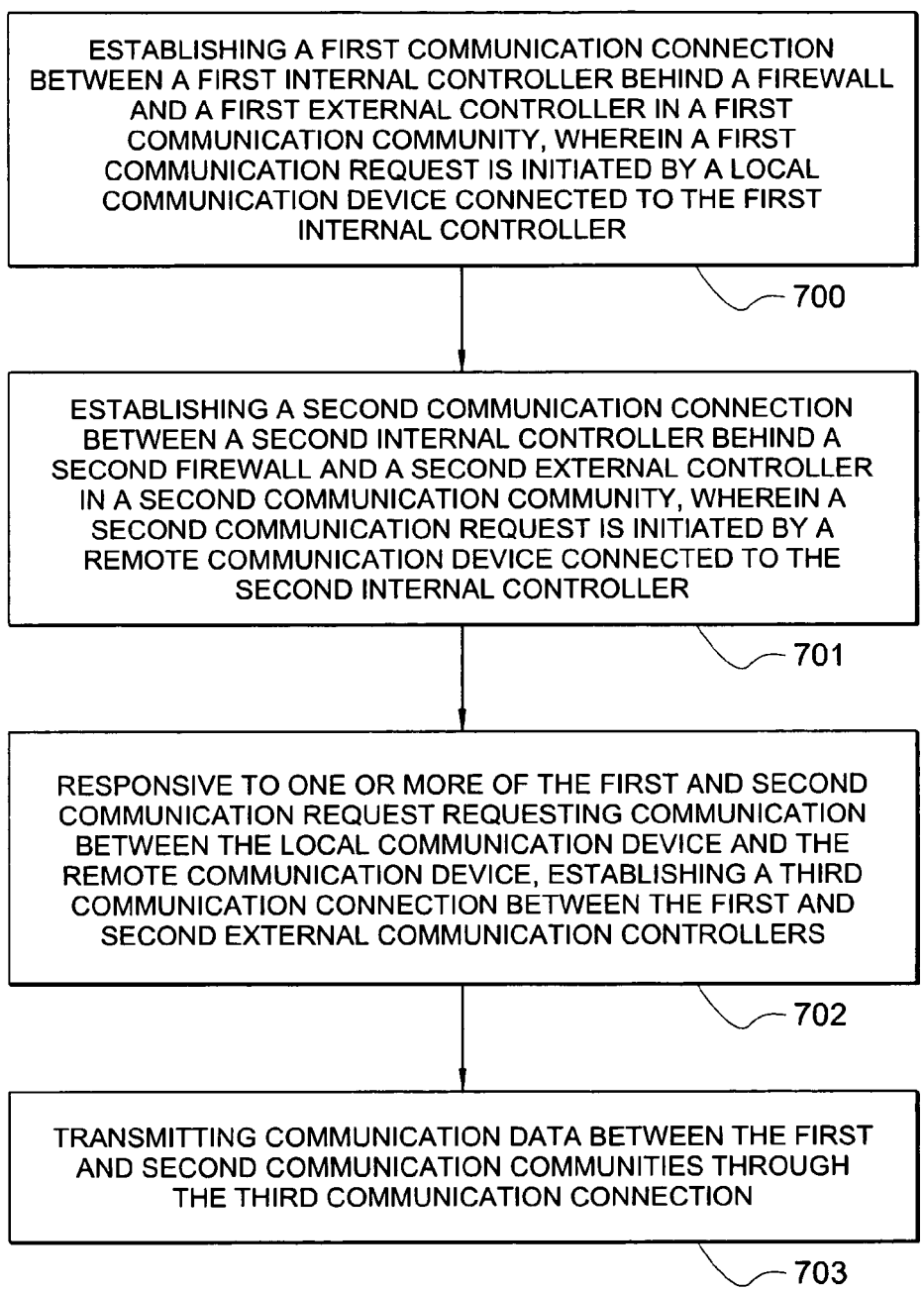
FIG. 7 is a flowchart illustrating example steps executed in implementing one embodiment of the present invention.

FIG. 7 is a flowchart illustrating example steps executed to implement one embodiment of the present invention. In step 700, a first communication connection is established between a first internal controller behind a firewall and a first external controller in a first communication community, where a local communication device connected to the first internal controller initiates a first communication request. A second communication connection is established, in step 701, between a second internal controller behind a second firewall and a second external controller in a second communication community, where a remote communication device connected to the second internal controller initiates a second communication request. In response to either communication request requesting communication between the local and remote communication devices, a third communication connection is established, in step 703, between the first and second external communication controllers. In step 704, communication data is transmitted between the first and second communication communities through the third communication connection.

Figure 8:
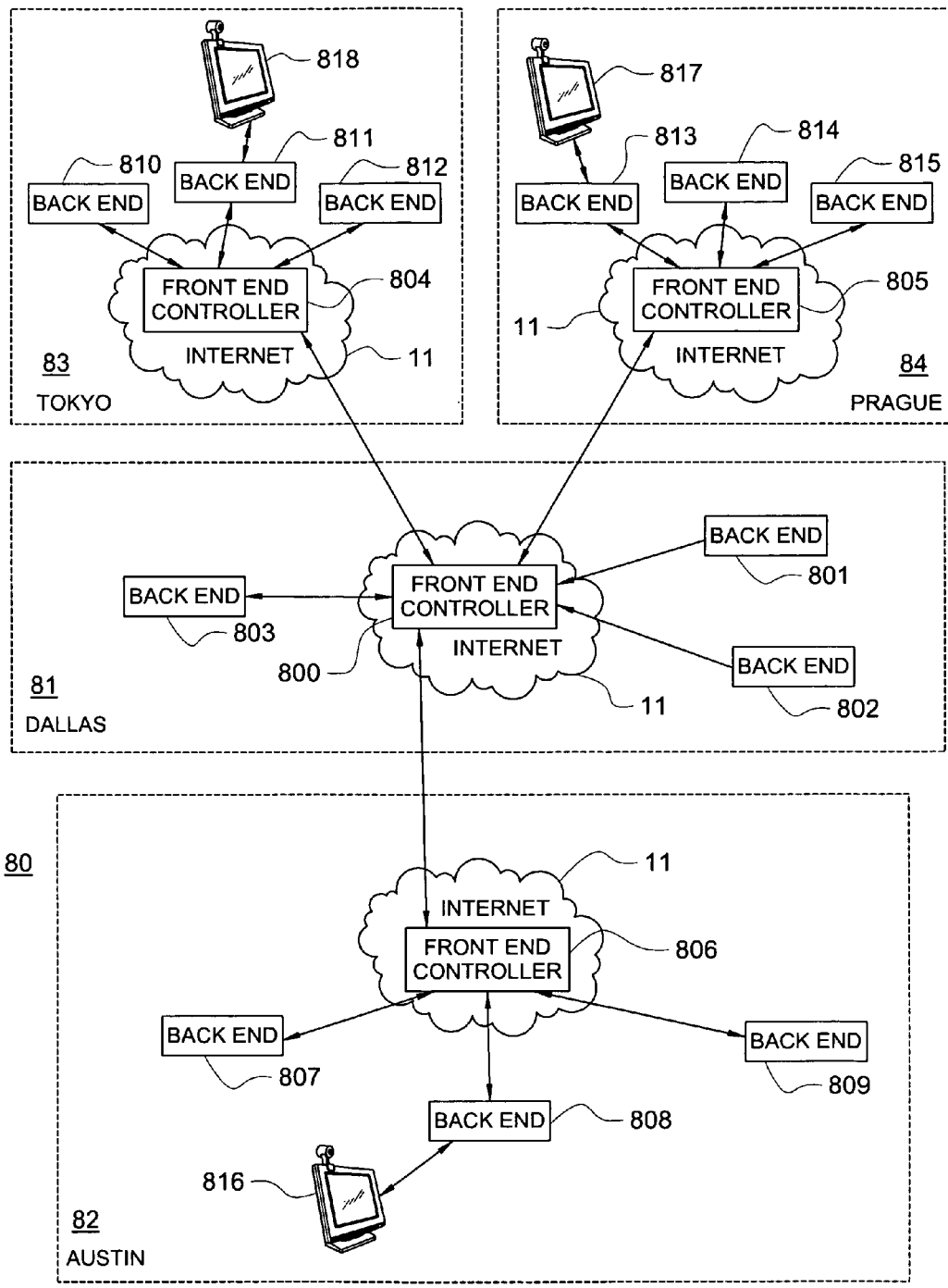
FIG. 8 is a block diagram illustrating a communication environment configured according to one embodiment of the present invention.

FIG. 8 is a block diagram illustrating communication environment 80 configured according to one embodiment of the present invention. Communication environment 80 is made up of several sub-communities: Dallas communication community (DCC) 81, Austin communication community (ACC) 82, Tokyo communication community (TCC) 83, and Prague communication community (PCC) 84. As with ECC 50, described in FIG. 5, each of the different sub-communities is capable of acting as its own autonomous communication community. However, the embodiment described in FIG. 8 includes a hierarchical relationship amount the various communities and, more specifically, the front end controllers.

The front end controller for DCC 81, front end controller 800, is configured to be a super controller. A super controller, as contemplated and described for the embodiment described in FIG. 8, is the main front end controller and operates as the communication conduit for the other sub-communities. While front end controller 800 facilitates data transfer between the backend controllers within DCC 81, backend controllers 801-803, it also facilitates data transfer between the backend controllers of ACC 82, backend controllers 807-809; TCC 83, backend controllers 810-812; and PCC 84, backend controllers 813-815.

In operation, a user at endpoint 816 desires to enter a video conference. The connection at endpoint 816 requesting to enter into the video conference causes backend controller 808 to transmit a communication request to front end controller 806 over Internet 11. Users at endpoint 818, in Tokyo, and endpoint 817, in Prague, also desire to participate in the video conference. The video conference requests from endpoint 817 and 818 cause backend controllers 813 and 811, respectively, to transmit communication requests to front end controllers 805 and 804, respectively. After authenticating and verifying the security keys transmitted by each of backend controllers 808, 811, and 813, front end controllers 804-806 open communication channels within ACC 82, TCC 83, and PCC 84. However, because the users within the different sub-communities are to be on the same video conference, the video data will be shared across the community borders of ACC 32, TCC 83, and PCC 84.

Instead of each sub-community communicating directly with the other sub-communities, as reflected in the embodiment described in FIG. 5, front end controllers 804-806 transmit the multimedia data to each other through the super controller, front end controller 800. Each of front end controllers 804-806 is configured to establish a communication connection with front end controller 800 whenever a destination address is located outside of its sub-community. Thus, once the communication channel is open in TCC 83 between endpoint 818 and front end controller 804, front end controller 804 transmits a communication request to front end controller 800. Front end controller 800 verifies and authenticates the security key transmitted from front end controller 804 and, once verified, the communication channel is opened. Front end controller 800 uses destination information for the video conference to open communication channels between itself and front end controller 805, to facilitate delivery and receipt of the video conference data to endpoint 817 in PCC 84, and front end controller 806, to facilitate delivery and receipt of the video conference data to endpoint 816 in ACC 82. A similar process is used when communication channels are to be set up between front end controllers 805 and 806 and front end controller 800.

It should be noted that in various additional and alternative embodiments of the present invention, the super controller, front end controller 800 may be configured to receive data and open communications channels only with specific network elements, such as with backend controllers 801-803 and front end controllers 804-806. By limiting the authorized network elements that may contact the super controller, the risk of unauthorized access to communication environment 80 is diminished.

It should be noted that in additional and/or alternative embodiments of the present invention, all front end controllers may be configured to communicate with specific network devices. As noted above, limiting the pool of potential devices that may access any particular front end controller, greatly reduces the risk of unauthorized access.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for a multimedia communication comprising:
  receiving, at a controller that is behind a firewall and that is communicatively coupled with a plurality of endpoint communication devices, a plurality of multiport packets of data in a multiport communication protocol for communication from at least one of the plurality of endpoint communication devices;
  converting, by said controller, said plurality of multiport packets into a plurality of single-port packets in a single-port communication protocol;
  receiving at an external controller a communication request from said controller behind said firewall, wherein said external controller is not behind said firewall;
  establishing a communication channel between said controller and said external controller;
  opening a second communication channel between said external controller and at least one other controller behind another firewall, wherein said at least one other controller is configured to service a single endpoint communication device;
  transmitting multimedia communication data between said controller and said at least one other controller wherein said multimedia communication data passes through said external controller; and
  distributing said multimedia communication data to one or more of said plurality of endpoint communication devices and said single endpoint communication device.

2. The method of claim 1 further comprising:
  verifying said communication request at said external controller.

3. The method of claim 1 further comprising:
  transmitting a security key from said controller to said external controller for authorization of said communication request.

4. The method of claim 1 further comprising:
  sending an external request from said external controller to an additional external controller responsive to said communication request requesting to communicate with an additional endpoint communication device connected to said additional external controller.

5. The method of claim 4 further comprising:
  establishing an external channel between said external controller and said additional external controller; and
  forwarding said multimedia communication data to said additional external controller from said external controller; and
  distributing said multimedia communication data to said additional endpoint communication device.

6. The method of claim 1 further comprising:
  issuing a central request from said external controller to a central controller responsive to said communication request requesting to communicate with an external endpoint device not connected to one or more of said controller and said at least one other controller; and
  receiving said multimedia communication data at said central controller.

7. The method of claim 6 further comprising:
  determining a peripheral controller connected to said external endpoint device;
  opening another external channel between said central controller and said peripheral controller;
  forwarding said multimedia communication data to said peripheral controller from said central controller; and
  distributing said multimedia communication data to said external endpoint device.

8. The method of claim 6 further comprising:
  distributing said multimedia communication data to said external endpoint device when said external endpoint device is connected to said central controller.

9. The method of claim 1 wherein said transmitting said multimedia communication data between said controller and said at least one other controller comprises:
- transmitting from said controller said plurality of single-port packets over a commonly-open port to said at least one other controller, said plurality of single-port packets traversing one or more firewalls using said commonly-open port.

10. The method of claim 9 further comprising:
- receiving said plurality of single-port packets at said at least one other controller;
- reconverting, by said at least one other controller, said received plurality of single-port packets into said multiport communication protocol, resulting in reconverted plurality of multiport packets; and
- delivering, from said at least one other controller to said single endpoint communication device, said reconverted plurality of multiport packets using two or more ports associated with said multiport communication protocol.

11. A communication community comprising:
- one or more shared controllers connected to one or more endpoint communication devices, wherein said one or more shared controllers is behind a firewall, and wherein said one or more shared controllers is operable to convert a plurality of multiport packets received from said one or more endpoint communication devices into a plurality of single-port packets in a single-port communication protocol;
- at least one individual controller connected to a single endpoint communication device, wherein said at least one individual controller is behind another firewall, and wherein said at least one individual controller is operable to reconvert said plurality of single-port packets into said multiport communication protocol, resulting in reconverted plurality of multiport packets, and transmit to said single endpoint communication device said reconverted plurality of multiport packets using two or more ports associated with said multiport communication protocol; and
- an external controller that comprises a device, said external controller in connection to said one or more shared controllers and said at least one individual controller, wherein said external controller is not behind said firewall or said another firewall, and wherein said external controller facilitates communication between ones of said one or more endpoint communication devices and said single endpoint communication device.

12. The communication community of claim 11 further comprising:
- a verification utility within said external controller for verifying one or more communication requests from one or more of said one or more shared controllers and said individual controller.

13. The communication community of claim 11 further comprising:
- a security key repository within each of said one or more shared controllers and said individual controller, wherein said one or more shared controllers and said individual controller transmit a security key for verification by said external controller for each communication request issued to said external controller.

14. The communication community of claim 11 further comprising:
- an external communication interface within said external controller for communicating with a second communication community.

15. The communication community of claim 14 wherein said external controller communicates with a central communication controller to establish a communication channel with said second communication community.

16. The communication community of claim 11 wherein said one or more shared controllers, and said at least one individual controller each comprise a device.

17. A method for communicating comprising:
- establishing a first communication connection between a first internal controller behind a firewall and a first external controller in a first communication community, said first external controller not behind said firewall, wherein a first communication request is initiated by a local communication device connected to the first internal controller;
- establishing a second communication connection between a second internal controller behind a second firewall and a second external controller in a second communication community, said second external controller not behind said second firewall, wherein a second communication request is initiated by a remote communication device connected to the second internal controller;
- responsive to one or more of the first and second communication request requesting communication between the local communication device and the remote communication device, establishing a third communication connection between the first and second external communication controllers; and
- transmitting communication data between the first and second communication communities through the third communication connection, wherein said transmitting comprises:
  - receiving, at a first intermediate communication device that is behind said firewall a plurality of multiport packets of data in a multiport communication protocol for communication from said local communication device in said first communication community,
  - converting, by said first intermediate communication device, said plurality of multiport packets into a plurality of single-port packets in a single-port communication protocol,
  - transmitting, through the third communication connection, said plurality of single-port packets to a second intermediate communication device that is behind said second firewall,
  - receiving said plurality of single-port packets at said second intermediate communication device,
  - reconverting, by said second intermediate communication device, said received plurality of single-port packets into said multiport communication protocol, resulting in reconverted plurality of multiport packets, and
  - delivering, from said second intermediate communication device to said remote communication device in said second communication community, said reconverted plurality of multiport packets using two or more ports associated with said multiport communication protocol.

18. The method of claim 17 further comprising:
- verifying at said first external controller said first communication request prior to said establishing said first communication connection; and
- verifying at said second external controller said second communication request prior to said establishing said second communication connection.

19. The method of claim 18 further comprising:

issuing a third communication request between said first and second external controllers; and verifying said third communication request prior to said establishing said third communication connection.

20. The method of claim 17 wherein said establishing a third communication connection comprises:

issuing a third communication request to a central communication controller;

establishing a first central communication channel between said first external controller and said central communication controller;

issuing a fourth communication request from said central communication controller to said second external controller; and establishing a second central communication channel between said central communication controller and said second external controller.

21. The method of claim 20 further comprising:

verifying said third communication request at said central communication controller prior to said establishing said first central communication channel;

verifying said fourth communication request prior to said establishing said second central communication channel.

22. The method of claim 17 wherein said first internal controller comprises said first intermediate communication device; and wherein said second internal controller comprises said second intermediate communication device.

23. The method of claim 17 wherein said transmitting, through the third communication connection, said plurality of single-port packets to a second intermediate communication device that is behind said second firewall comprises:

transmitting said plurality of single-port packets over a commonly-open port.

* * * * *